United States Patent [19]
Bedrosian et al.

[11] Patent Number: 5,495,537
[45] Date of Patent: Feb. 27, 1996

[54] METHODS AND APPARATUS FOR MACHINE VISION TEMPLATE MATCHING OF IMAGES PREDOMINANTLY HAVING GENERALLY DIAGONAL AND ELONGATE FEATURES

[75] Inventors: David P. Bedrosian, Franklin; William M. Silver, Medfield, both of Mass.

[73] Assignee: Cognex Corporation, Natick, Mass.

[21] Appl. No.: 252,190

[22] Filed: Jun. 1, 1994

[51] Int. Cl.⁶ .................................................... G06K 9/62
[52] U.S. Cl. ............................................ 382/209; 382/294
[58] Field of Search .............................. 382/23, 26, 30, 382/34, 37, 42, 48, 201, 204, 209, 216, 218, 226, 278, 291, 294

[56] References Cited

U.S. PATENT DOCUMENTS

| | | | |
|---|---|---|---|
| 4,547,800 | 10/1985 | Masaki | 358/107 |
| 4,581,760 | 4/1986 | Schiller et al. | 382/4 |
| 4,651,341 | 3/1987 | Nakashima et al. | 382/34 |
| 4,754,493 | 6/1988 | Coates | 382/48 |
| 4,843,631 | 6/1989 | Steinpichler et al. | 382/43 |

*Primary Examiner*—Leo Boudreau
*Assistant Examiner*—Andrew W. Johns

*Attorney, Agent, or Firm*—Choate, Hall & Stewart

[57] ABSTRACT

A machine vision apparatus of the type having a match-scoring functionality for generating a metric as a function, e.g., a correlation, of applied image signals features an improvement for estimating a location of a template in a candidate image. The improvement is characterized by a segment peak finding element that applies to the match-scoring element a plurality of pairs of image signals along a "segment." Each such pair includes a signal representing the template and a signal representing a respective portion of the candidate image taken along a first axis. Thus, ignoring their template components, plural pairs of signals can represent successive adjacent portions of the candidate image that are "in line" along a first axis. Functionality within the segment peak finder determines a peak value of the metric generated by the match-scoring element in response to application of the pairs within the segment. A hill climbing element invokes the segment peak finder means to determine an image peak from among a plurality of segment peaks. To this end, the hill climber invokes the segment peak finder, e.g., with successive adjacent segments along the y-axis, where each segment itself is oriented, e.g., along the x-axis. The hill climber determines the image peak directly from the segment peaks, or by interpolation or extrapolation therefrom. The location of the template within the candidate image is, itself, determined from the position of the image peak.

24 Claims, 6 Drawing Sheets

METHODS AND APPARATUS FOR MACHINE VISION TEMPLATE MATCHING OF IMAGES PREDOMINANTLY HAVING GENERALLY DIAGONAL AND ELONGATE FEATURES

BACKGROUND OF THE INVENTION

This invention relates to machine vision and, more particularly, to methods and apparatus for template matching.

Template matching is a fundamental operation in machine vision. It is used to determine the location of a mark, object or other template in an image. For example, in an industrial assembly operation, machine vision may be employed to determine the position of a part based on the position of an imprinted logo. To this end, an image of the part (i.e., the candidate image) is analyzed to determine the location of an image of the mark (i.e., the template image). Once determined, that location is passed to the assembly equipment for placement of the part.

The art provides many template matching schemes. Many of these operate by applying a correlation function—or other matching function—to determining a degree of similarity between the template image at each location in the candidate image. In one simple scheme, the such a match-scoring function is applied at all locations in the candidate. The resulting scores are compared with one another to find a peak, the position of which is taken as the position of the template in the candidate image. According to a more complex schemes, a "hill climbing" technique is used reduce the number of locations at which the match-scoring function must be applied. There, the function is applied only in an "uphill" direction, i.e., the direction that leads to increasing similarity metrics or scores.

In a 4-way hill climbing system, the match-scoring function is applied in four directions from each new point in the image: north, south, east, and west. In an 8-way system, the function in applied in eight directions: north, northeast, east, southeast, south, southwest, west, and northwest. Results are more rapidly achieved by a 4-way system, but they are not as reliable as those of an 8-way system.

A problem with prior art template matching techniques, such as the 4-way and 8-way searches, is that they fail to identify correctly the locations of all templates. Sometimes, they identify a corresponding peak score at the wrong location in the candidate. At other times, they fail to find any peak at all.

An object of this invention therefore is to provide improved methods and apparatus for template matching. More particularly, an object is to provide methods and apparatus for template matching that correctly identify the location of a template in a candidate image, regardless of the shape of the template or its orientation in the candidate.

Still another object is to provide such methods and apparatus that are faster and more accurate than the prior art hill climbing techniques.

Yet another object is to provide methods and apparatus for template matching that can be implemented cost effectively in a variety of environments.

These and other objects of the invention are evident in the discussion that follows.

SUMMARY OF THE INVENTION

The foregoing and other objects are attained by the invention which provides, in one aspect, an improvement on a machine vision apparatus of the type having match-scoring functionality for generating a metric as a function, e.g., a correlation, of applied image signals. The improvement, for estimating a location of a template in a candidate image, is characterized by a segment peak finding element that applies, to the match-scoring element, a plurality of pairs of image signals along a "segment." Each such pair includes a signal representing the template and a signal representing a respective portion of the candidate image taken along a first axis. Functionality within the segment peak finder determines a peak value for the segment based on the metrics in response to the pairs within the segment.

In further accord with this aspect of the invention, a hill climbing element invokes the segment peak finder means to identify an image peak from among the segment peaks. To this end, the hill climber invokes the segment peak finder with successive adjacent segments along a second axis. The hill climber determines the image peak directly from the segment peaks, or by interpolation therefrom. The location of the template within the candidate image is determined from the position of the image peak.

In yet another aspect of the invention, the hill climber invokes the peak finder to process only segments in the direction of increasing peaks. Starting at a given segment, the hill climber can test segments in both directions along the second axis to determine in which direction the peak is larger. Further segments are tested in that direction until the peak is reached (i.e., until an adjacent segment has a lower segment peak height).

A still further aspect of the invention provides an improvement on a machine vision apparatus of the type described above, wherein the apparatus includes a training element that determines characteristics of the template viz. a model of the candidate image (i.e., a "model image") to determine whether the hill climber and segment peak finder should be invoked to determine the location of the template. If not, conventional techniques, such as 4-way or 8-way hill climbing, can be employed to determine that location.

In a related aspect, the training element applies to the match-scoring element a plurality of pairs of image signals, each including a signal representing the template and a signal representing a respective portion of the model image, over a search region in which the hill climber and segment peak finder are expected to run. Unlike the segment peak finder, the trainer need not apply the image pairs on a segment-by-segment basis. A correlation space element indexes the values of the metric generated by the match-scoring element in response to application of the pairs and identifies a geometric surface, e.g., an ellipsoid, that best fits the metric values returned by the peak finder and indexed by the correlation space element.

The hill climber responds to selected characteristics of that geometric surface for determining whether to invoke the segment peak finder. It can do so, for example, where the elongate axis of the ellipsoid lies on a diagonal with respect to the first axis and where the elongation ratio of the ellipsoid is greater then a threshold value.

In another aspect of the invention, the hill climber and peak finder respond to a characteristic of the ellipsoid to determine the orientation of the first and second axes. Thus, the segment peak finder generates image peaks along the axis in which the ellipsoid has the greatest slope, while the hill climber invokes the peak finder for segments along the axis in which the ellipsoid has a lesser slope.

In still other aspects, the invention provides methods for machine vision paralleling the operations described above.

These and other aspects of the invention are evident in the attached drawings and in the description that follows.

BRIEF DESCRIPTION OF THE DRAWINGS

A fuller understanding of the invention may be attained by reference to the drawings, in which.

DETAILED DESCRIPTION OF THE ILLUSTRATED EMBODIMENT

Figure 1:
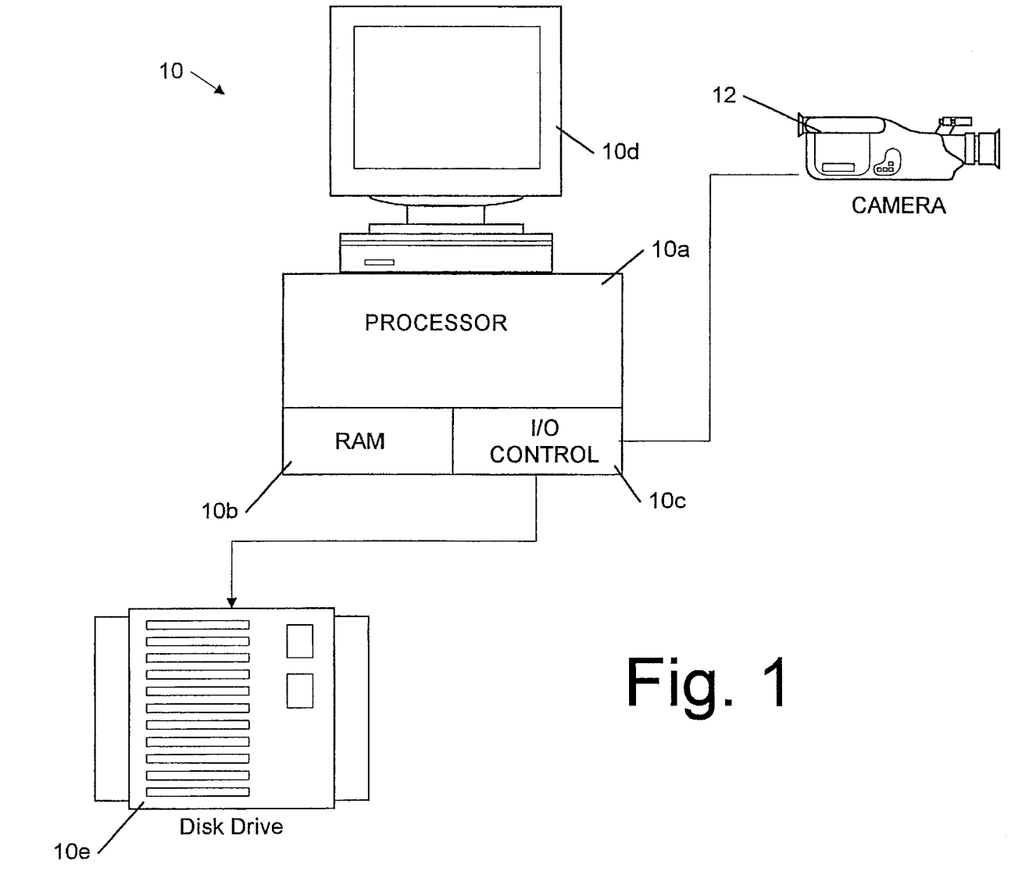
FIG. 1 depicts a preferred environment in which machine vision methods and apparatus according to the invention are implemented.

FIG. 1 depicts a preferred hardware environment in which preferred machine vision methods and apparatus according to the invention are implemented. The environment includes digital data processor 10, having processor 10a, random access memory 10b, input/output controller 10c, monitor 10d and secondary storage device (e.g., disk drive) 10e. Digital data processor 10, including components 10a–10e, preferably comprise a conventional workstation or personal computer of the type known in the art, as configured (e.g., via programming or special purpose hardware) for operation in accord with the teachings hereof. The illustrated environment further includes camera 12 for generating digital images representing an image in the field of view. The camera 12 is of conventional construction and operation known in the art.

Figure 2:
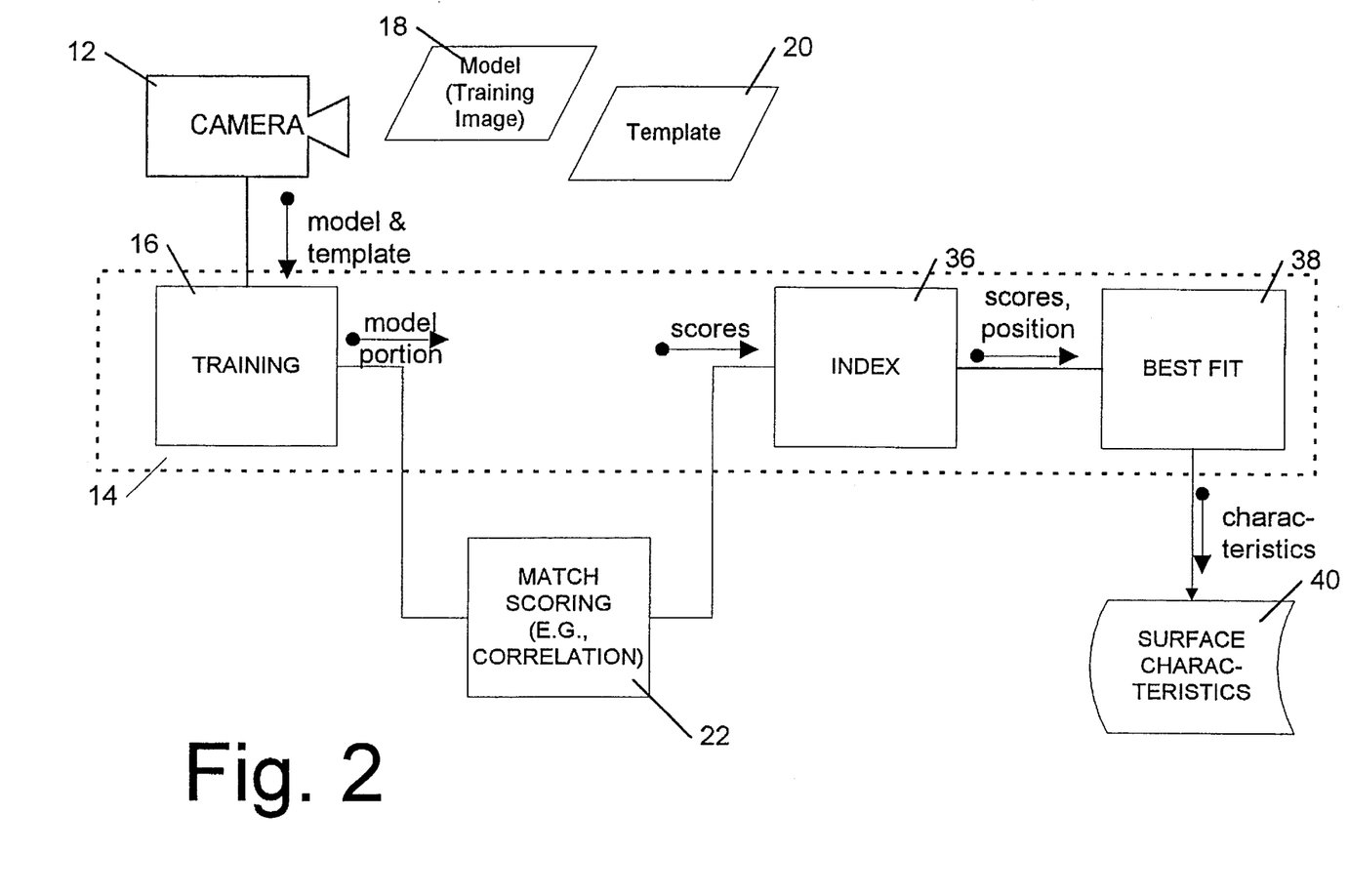
FIG. 2 depicts preferred functionality for "training" a machine vision method and apparatus according to the invention.

FIG. 2 depicts preferred functionality 14 for training a machine vision apparatus for locating a template in a candidate image. Functionality 14 includes training element 16, coupled to camera 12 to receive signals representative of a template 20 and a model 18 of the candidate. Those skilled in the art will appreciate that these signals need not be generated by camera 12. Rather, they can be retrieved from a data store (e.g., based on a previously stored camera image) or they can be generated "artificially" as computer graphics images by processor 12a.

Training element 16 applies to a match-scoring element 22 a plurality of pairs of image signals, each including a signal representing the template and a signal representing a respective portion of the model 18 image.

Figure 4:
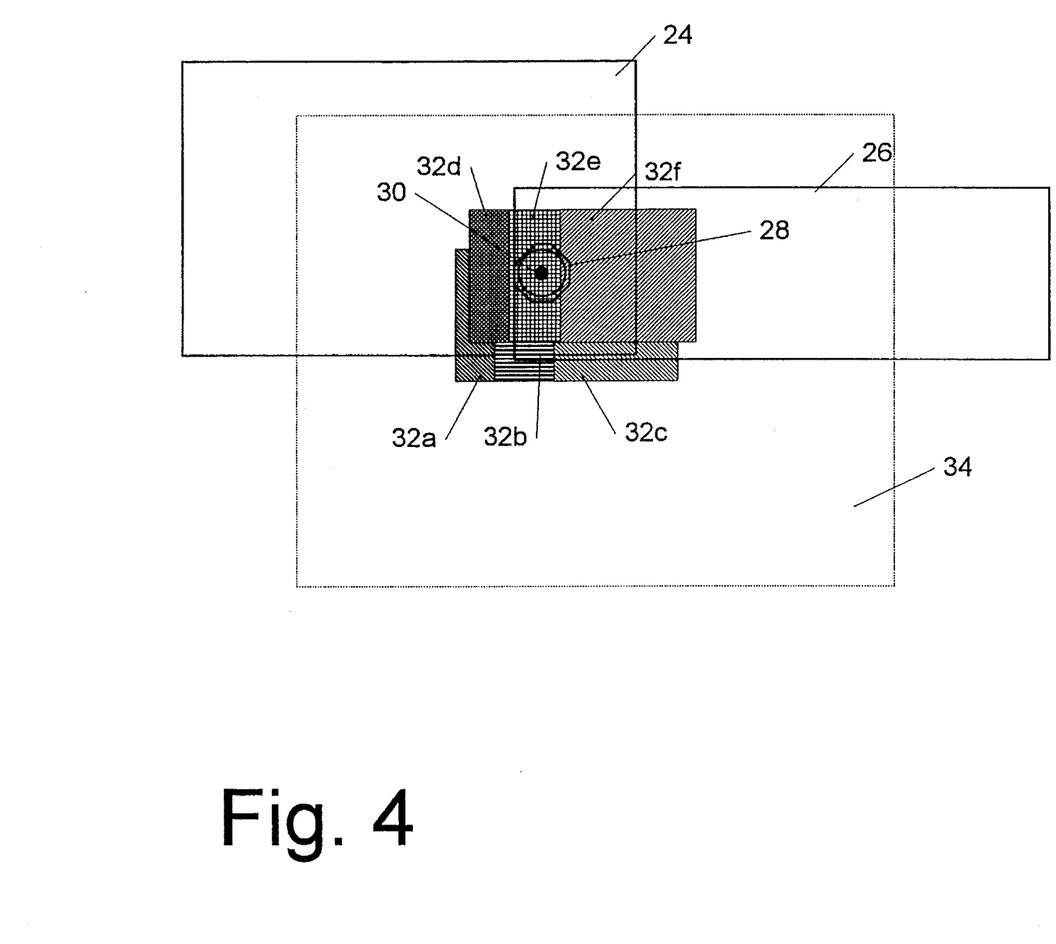
FIG. 4 depicts the use of portions of a model image during the training phase of a method and apparatus according to the invention.

Exemplary such portions are shown in FIG. 4, depicting a model image 34 of assembled parts 24 and 26 that are to be inspected to locate a template 28, representing an end view of an assembled nut-and-bolt combination, e.g., centered at location 30. As illustrated by exemplary shaded portions 32a–32f, the training element 14 applies to match-scoring element 22 pairs of image signals representing overlapping regions of the model candidate image 34.

These regions or portions 32a–32f are typically sized to encompass the template and, more preferably, are sized to encompass the template with an additional five pixels on all sides.

Referring back to FIG. 2, the match-scoring element 22 generates a metric as a function of the signals in each image pair, preferably, representing the degree of similarity between those signals. A preferred such match-scoring element is a conventional gray-scale correlation vision tool for generating a score representing a correlation of the signals. Such tools are described in the literature and are commercially available, e.g., as part of "search" routines sold by Itran, Applied Intelligent Systems, Inc., ("AISI") and/or Imaging Technology, Inc. ("ITI"). A preferred such gray-scale correlation vision tool is sold by the assignee hereof, Cognex Corporation, as part of a tool referred to under the trade name "Search." In addition to so-called search tools, other vision tools may also be used for match-scoring element 22. These include general Hough transform.

Indexing element 36 indexes the metrics (or scores) generated by match-scoring element 22. Preferably, that indexing involves storing the metrics in accord with a location of a designated point, e.g., the center point, in each respective region.

Best fit element 38, in turn, identifies a geometric surface that best fits the indexed metric values. In a preferred embodiment, that geometric surface is preferably elongate about an axis of symmetry and, still more preferably, is an ellipsoid. As those skilled in the art will appreciate, indexing element 36 and correlation element 22 together determine a correlation space for the template and model images.

Best fit element 38 stores characteristics of the geometric surface, in store 40, for use at runtime, i.e., when determining the location of the template in an actual candidate image. In a preferred embodiment that utilizes an ellipsoidal surface, those characteristics include the angle of the elongate axis of the ellipsoid with respect to the first axis (e.g., the x-axis) and the elongation ratio of the ellipsoid (e.g., its maximum length to its maximum width).

Figure 3:
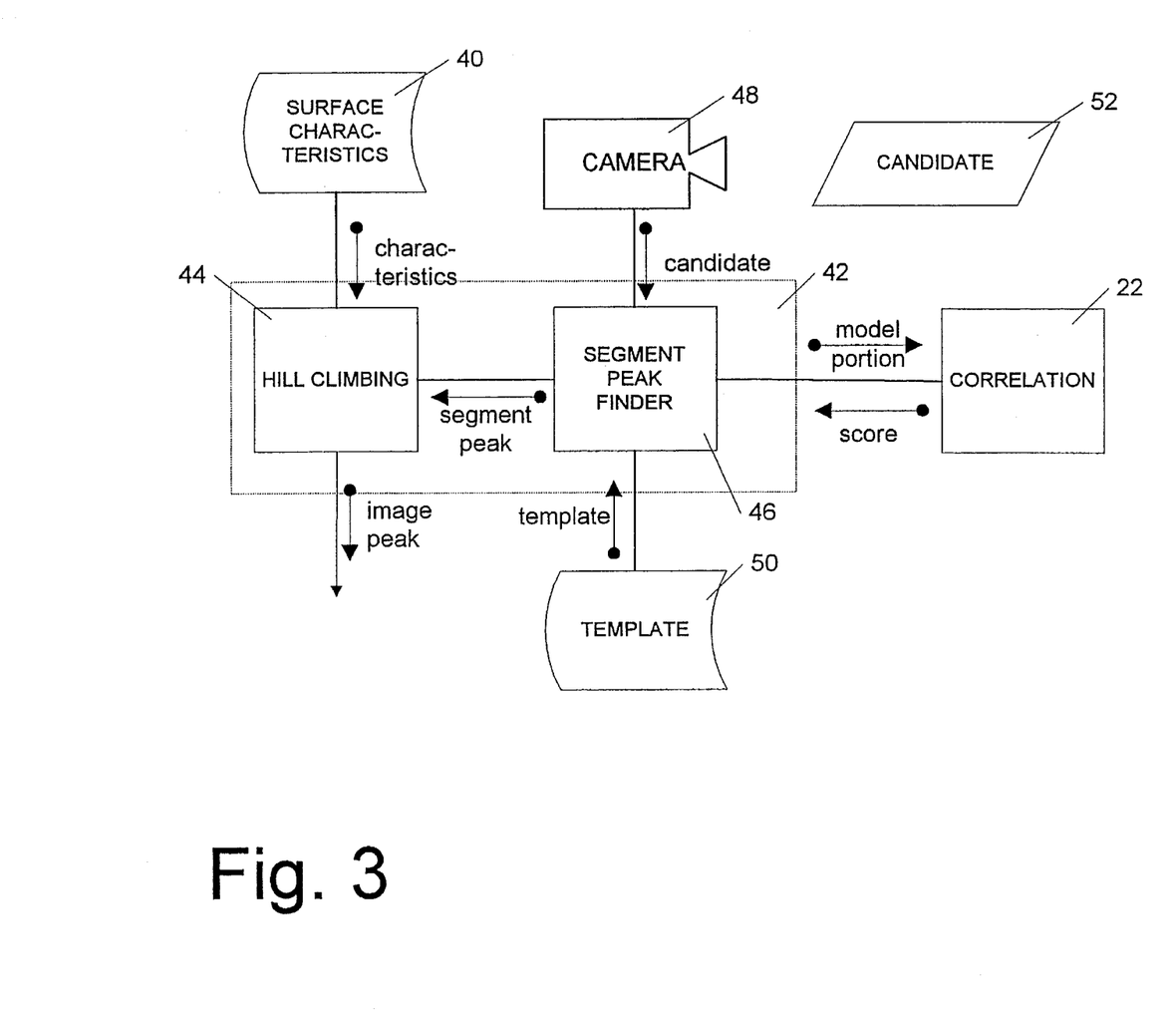
FIG. 3 depicts preferred run time functionality for locating a template image in a candidate image in a machine vision method and apparatus according to the invention.

FIG. 3 depicts preferred runtime functionality 42 for locating a template image in a candidate image in a machine vision apparatus according to the invention. As shown in the drawing, functionality 42 includes hill climbing element 44 and segment peak finding element 46. Peak finder 46 is coupled to camera 48 (which, like camera 12, is of conventional construction and operation known in the art) for receiving a digital signal representative of a candidate 52 image. Peak finder 46 also receives a digital signal representative of the template from store 50. This is preferably the same, or a similar, template image used in connection with the training functionality 14, discussed above.

Figure 5:
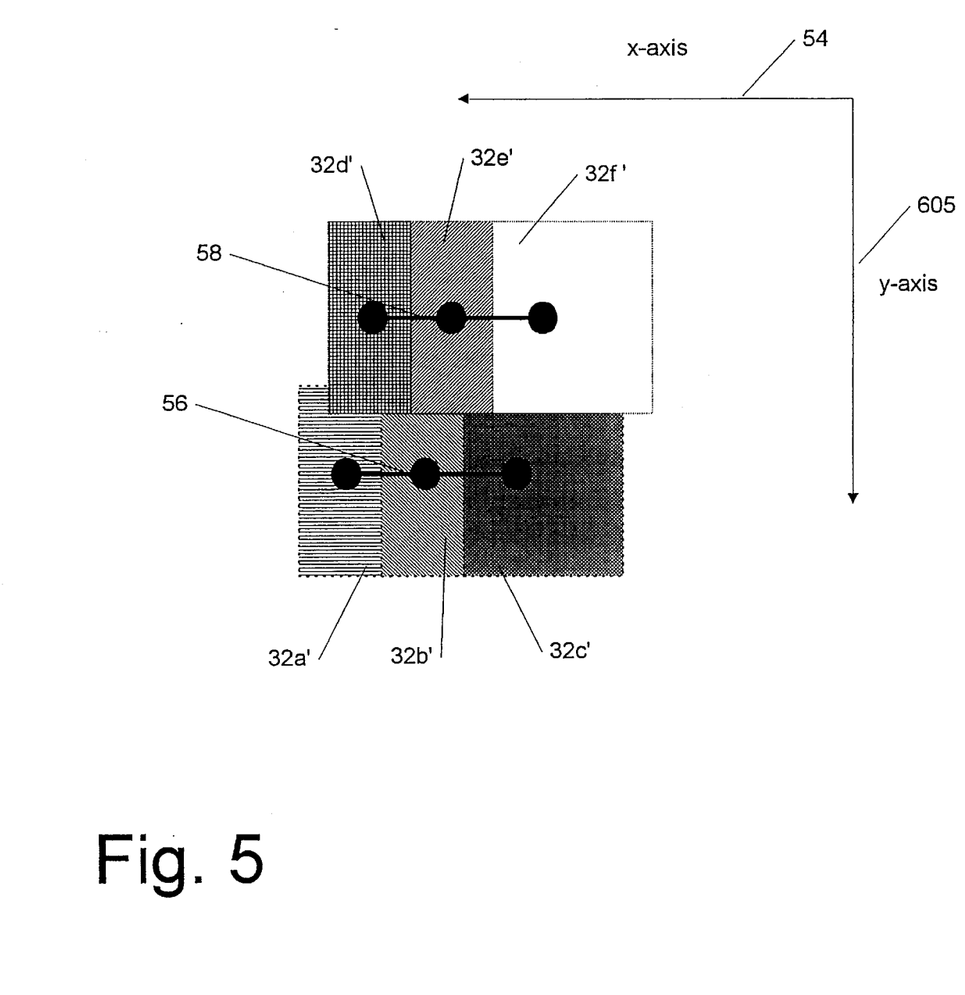
FIG. 5 depicts the use of portions of a candidate image during the runtime phase of a method and apparatus according to the invention.

Peak finder 46 applies to the match-scoring element 22 a plurality of pairs of image signals along a "segment" of the candidate image. Each pair includes a signal representing the template and a signal representing a respective portion of the candidate 52 image along a first axis. In a preferred embodiment, that axis is chosen as one in which the slope of the ellipsoid is greatest, e.g., x-axis 54. Referring to FIG. 5, model image portions 32a'–32c' define a first such segment 56.

Peak finder 46 determines a peak value of the metrics generated by the match-scoring element 22 in response to application of the pairs within each segment. This is preferably accomplished by linear interpolation among the peak values for each pair in the segment and, more preferably, by parabolic interpolation (for higher resolution models) or, alternatively, by the technique illustrated in FIG. 6 (for lower resolution models).

Referring to that drawing, a more precise approximation of the segment peak is derived by using two points on each leg or side of the spike (element "p," FIG. 6) to form two intersecting lines. The intersection of the two lines provides a more precise approximation of the center of the spike.

Figure 6:
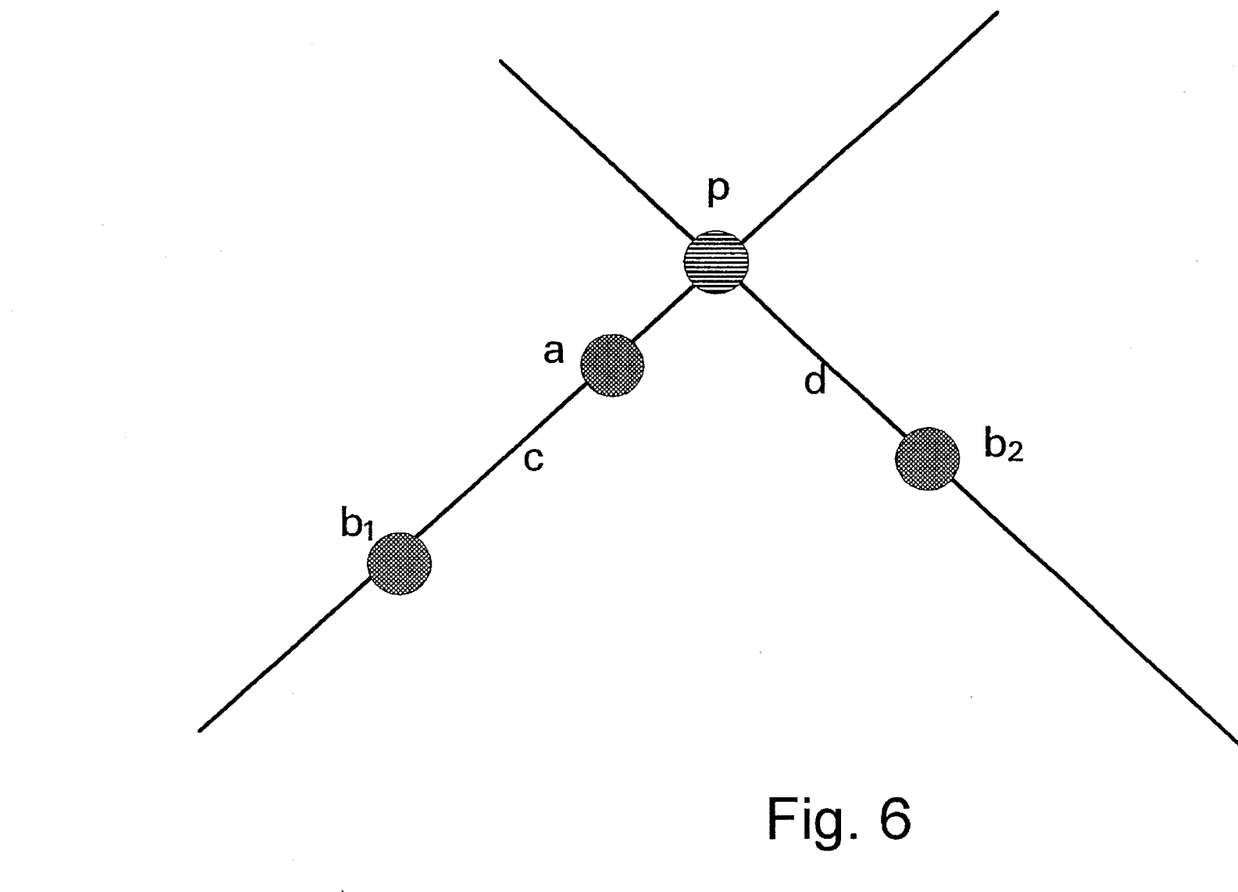
FIG. 6 depicts a preferred technique interpolation of a segment peak in an apparatus and method according to the invention.

More particularly, referring to FIG. 6, the peak finder 46 identifies the highest, or peak, point "a" from among the peak values for each pair in the segment, as well as its next-highest neighboring points "$b_1$" and "$b_2$". The peak finder 46 then identifies a line "c" passing through peak point "a" and the lowest neighbor, "$b_1$". The estimated center "p" is interpolated as the intersection of "c" and a line "d" that has the negative slope of line "c" that passes through the highest neighbor, "$b_2$".

Referring back to FIG. 3, hill climber 44 responds to characteristics of the geometric surface identified in the training phase for determining whether to invoke the segment peak finder to facilitate finding an image peak. In a preferred embodiment, it does so where the elongate axis of the ellipsoid lies on a diagonal with respect to the x-axis 54, i.e. preferably between 22.5° and 67.5°; where the elongation ratio of the ellipsoid is greater then 2.5 and, preferably, greater than 2.8. If these conditions are not met, hill climber 44 returns control to processor 10a for completion of template matching in accord with conventional, commercially available techniques—preferably, a hill climbing technique of the type described above and, more preferably, a technique as so executed by vision tools provided by the assignee hereof under the tradename "Search."

Hill climbing element 44 invokes the segment peak finder 46 to determine an image peak from among a plurality of segment peaks. To this end, the hill climber 44 invokes the segment peak finder with successive adjacent segments, preferably, along the axis in which the slope of the ellipsoid changes least rapidly, e.g., y-axis 60. Thus, as illustrated in FIG. 5, hill climber 44 first invokes the segment peak finder with segment 56 and, then, for example, with segment 58 comprising model image portions 32$d'$–32$f$.

Although the hill climber 44 can invoke the peak finder 46 to determine the peak value for all segments within the putative search region, preferably, the hill climber 44 invokes peak finder 46 to process only segments in the direction of increasing peak height. Thus, hill climber 44 invokes peak finder 46 to determine the peak of the segment 58, as well as that of the segment below segment 56. The hill climber 44 proceeds in the direction of the higher of those peaks (normally, only one of those peaks will be larger than that of segment 56). Movement in that direction continues until the segment peaks begin to decrease.

Having obtained from the peak finder 46 the peaks of relevant segments, hill climber 44 determines the value and location of the image peak by interpolation, preferably, linear interpolation and, more preferably, parabolic interpolation or that described in connection with FIG. 6. The location of the template image within the candidate image is determined from the position of the image peak, e.g., by addition of any necessary offsets in the x-axis and y-axis direction.

A further understanding of the construction and operation of a preferred template matching system according to the invention is provided in the discussion that follows.

By way of further background, models (i.e., candidate and model images) that consist of predominantly diagonal features sometimes cause problems for conventional template matching systems. At run-time, these models might be found in the wrong position or may not be found at all. We have identified at least two reasons for these run-time problems:

1. In systems that use a 4-way or "4-connected" hill climbing technique, diagonal models often result in a diagonal hill oriented along the diagonal axes. If we are somewhere on the hill and only the north, south, east and west neighbors are checked, it may appear that we are at the peak. However, the true peak may be found by looking at the northeast, northwest, southeast, or southwest neighbors. The following correlation space illustrates this phenomenon:

| 1 | 11 | 70 | 340 | 639 |
|---|---|---|---|---|
| 11 | 73 | 428 | 795 | 335 |
| 86 | 475 | 991 | 452 | 81 |
| 375 | 821 | 405 | 63 | 9 |
| 693 | 327 | 55 | 7 | 0 |

A 4-connected system gives rise to local peaks at the locations where the correlation score is 795 and 821.

2. Sometimes, usually at reduced resolution, the hill can be very sharp and therefore be undersampled by the pixel grid. If it is also diagonal, sometimes it cannot be climbed even using an 8-connected technique. The following correlation space illustrates this phenomenon:

| 346 | 240 | . | . | . | . | . |
|---|---|---|---|---|---|---|
| 49 | 501 | 34 | . | . | . | . |
| . | 319 | 406 | . | . | . | . |
| . | 21 | 621 | 173 | . | . | . |
| . | . | 336 | 828 | 34 | . | . |
| . | . | 27 | 812 | 359 | . | . |
| . | . | . | 179 | 636 | 29 | . |
| . | . | . | . | 406 | 290 | . |
| . | . | . | . | 55 | 457 | 38 |
| . | . | . | . | . | 258 | 272 |

In this space, if we begin hill climbing at (2,2), the correlation value of 501 appears to be a peak, even considering all eight neighbors. The same thing happens at (6,9), where 457 appears to be a peak. In this case, the hill is oriented at an angle that is not aligned with the X or Y axes and it is undersampled.

Methods and apparatus according to the invention resolve the problems described in the previous section. They provide a solution in two parts: training-time and run-time. The training part is responsible for determining if the model is diagonal, and, if it is, computing some parameters that will be used at run-time. The run-time part uses these parameters and an alternative hill climbing strategy for diagonal models.

The basic idea is to correlate the model with its own training image ("autocorrelation") and then analyze the results to determine if the model is diagonal, and if so, compute the run-time parameters. Specifically, the methodology is as follows:

1. Generate an autocorrelation "space" for the model. A window of the training image is constructed which is centered about the model's position, and which is larger than the model itself. The model is then correlated with this window at every position where the model fits within the window (exhaustive correlation).

2. Compute the least-squares best fit of a parabolic surface to the autocorrelation data. To reduce the noise, the autocorrelation data is thresholded. The current method is to compute the best fit for a number of thresholds (1, 100, 200, 300 and 400), and to compute the error for each threshold. Then, the threshold that produces the minimum error value is chosen as the best fit.

Computing the least-squares fit involves summing up a set of quantities and then solving six equations for six unknowns, using a matrix technique. The result of this is the set of coefficients (a-f) for the general equation of the parabolic surface, $$z=ax^2+by^2+cxy+dx+ey+f\}$$

which provides the best fit to the data.

3. Using the coefficients found in step 2, derive the geometric parameters for the parabolic surface. These geometric parameters include the angle of the surface projected onto the X-Y plane (theta) and the "sharpness" of the surface along the major and minor axes (a' and b', respectively).

4. Based on the values of a',b' and theta, determine if the model is diagonal. The ratio b'/a' is a measure of how strongly angled the model is, and theta is the actual angle. Thus, if the ratio b'/a' is above some threshold, and theta is closer to ±45 degrees than it is to 0 or ±90 degrees, the model is diagonal. The value of theta is saved and used at run-time.

Still preferred embodiments of the invention might reduce the number of thresholds that must be tried, incorporate a rapid method for determining if a model might be diagonal.

The diagonal model searching, or run-time, methodology first checks to see if the model is indeed diagonal. If so, the diagonal methodology described herein is used. Otherwise, a conventional standard hill climbing methodology is run. The diagonal methodology according to the invention will be slower than the standard methodology, mainly because more correlation positions have to be computed. In other words, more hill climbing steps have to be taken. This should not prove overly burdensome in most applications, since the majority of models are not likely to be diagonal, and therefore can be analyzed by conventional techniques. Those that are diagonal may take longer than before, but at least they will be found correctly.

The methodology of the invention solves both of the hill climbing problems presented above. It is essentially an "8-connected" methodology, so the first problem is handled easily. The undersampled problem is handled by a subpixel interpolation method that interpolates the Z value, as well as the X and Y offsets. The interpolated Z value is then used as the basis for the hill climbing.

The methodology uses the angle computed at training-time mostly as an optimization. The angle is used to determine where the next hill climbing step should be taken, and this sometimes saves steps. The methodology has two basic forms, horizontal and vertical, and the choice of which to run is made based on the angle information.

The accuracy of the angle value is not crucial. In preliminary testing, all test images were successfully hill-climbed with angle value of 0 and 90 degrees. Note, however, that many of the models in the database are approximately 45 degrees, so this amounts to a typical error of about 45 degrees. If the actual angle is +45 and the methodology is run with an angle of −45, it will sometime fail. Again, the major benefit of a more accurate value of angle is that the methodology may take fewer steps and hence run faster.

The specific steps of the run-time methodology are as follows:

1. Based on theta, determine if the hill is more horizontal (theta<45°) or more vertical (theta>45°). If it is more vertical the X axis cuts the hill more steeply than the Y axis. We say that it is the "steep" axis and Y is the "gradual" axis. If it is more horizontal, the Y axis is the steep axis and X axis is the gradual axis. For simplicity, the remainder of this discussion assumes a more vertical hill, but the horizontal case is similar.

2. Starting at the initial row and column, perform one-dimensional hill climbing along the row (steeper axis), until the peak position is reached. The one-dimensional hill climbing methodology is described below.

3. Use the appropriate subpixel interpolation method to compute the subpixel position of the peak within the row and the interpolated Z value of the peak position. For higher resolution models, an interpolation method based on a parabolic fit is used. For lower resolution models, a linear interpolation method is used.

4. Using the interpolated subpixel position of the peak and the model angle, estimate the subpixel position of the peak in the next row. Round to the nearest whole pixel and use this as the starting point for the one-dimensional search in the next row.

5. Steps 2–4 are used to produce Z values for each row and to step from one row to the next. The overall strategy for determining which row to examine next is controlled by the one-dimensional hill climbing methodology, which is described below.

To summarize, the one-dimensional hill climbing methodology is used to climb the hill along the gradual axis. For each "step" along the gradual axis, a one-dimensional hill climbing is executed along the steep axis and subpixel interpolation is used to produce an interpolated Z score and position along the steep axis. The angle information is used to compute the starting position for the hill climbing in the next step along the gradual axis.

The one-dimensional hill climbing methodology is as follows:

1. Compute the Z value at the starting point. Set the best Z value to this Z value.

2. Compute the Z values at the two points on either side of the starting point (if they exist). Select the higher of these two values as the current Z value. The side that this point is on determines the initial climb direction.

3. While the current Z value is greater than or equal to the best Z value minus the hysteresis threshold, execute the following steps in a loop:
   3a. If the current Z value is higher than the best Z value, set the best Z value and best position to the current Z value and position.
   3b. If there is room to do so, step in the current climb direction and compute the next Z value. If there is no room to move, exit the loop.

4. Reverse the climb direction and set the current position and Z value to the best position and Z value. Climb in the new direction by executing the following steps in a loop:
   4a. If there is room to do so, step in the current climb direction and compute the next Z value. If there is no room to move, exit the loop.
   4b. If the current Z value is less than best Z value minus the hysteresis threshold, exit the loop.
   4c. If the current Z value is higher than the best Z value, set the best Z value and best position to the current Z value and position.

5. When the methodology terminates, the best Z value is the peak Z value and the best position is the peak position.

Still preferred embodiments of the invention might recognize that not all diagonal models require an 8-connected hill climbing, utilizing a "6-connected" methodology where appropriate; improve the subpixel interpolation method used to estimate the Z height of the true hill; and provide a subpixel interpolation method for reporting the final search position (as described in copending, commonly assigned patent application Ser. No. 08/252,845, filed this day herewith (Attorney Docket: CXS-042)).

Described above are improved methods and apparatus for template matching meeting the objects set forth above.

Those skilled in the art will appreciate that the embodiments described herein are exemplary and that further methods and apparatus incorporating modification thereto may fall within the scope of the invention, of which we claim:

1. In a machine vision apparatus of the type having
   match scoring means, responsive to a plurality of pairs of applied image signals, for generating a plurality of score signals as a selected function of said plurality of pairs of applied image signals,
   the improvement for estimating a location of a template in a candidate image, comprising:
   segment peak finding means, coupled to said match-scoring means, for applying thereto said plurality of pairs of image signals along a "segment," each such pair including a signal representative of said template and a signal representative of a respective successive portion of said candidate image along a first axis,
   said segment peak finding means including means for determining a peak value, and location thereof, of the score signals generated by said match-scoring means in connection with application of the plurality of pairs of image signals comprising said segment, such peak value and location thereof being referred to as a segment peak,
   a store of best-fit geometric surface characteristics,
   hill climbing means, coupled to said segment peak finding means, and to said store of geometric surface characteristics, for invoking said segment peak finding means, only if said best-fit geometric surface characteristics satisfy a predetermined condition, to determine the segment peaks of a plurality of segments, each such segment including image signals from different respective portions of said candidate image along a second axis,
   said hill climbing means including means for determining a peak value, and location thereof, of the segment peaks associated with said plurality of segments, such peak value and location thereof being referred to as an image peak, and
   means for estimating a location of said template in said candidate image as a function of a location of said image peak.

2. In a machine vision apparatus according to claim 1, the improvement wherein said segment peak finding means includes means for generating, for inclusion in each respective pair of signals along a segment, a signal representing a successive adjacent portion of said candidate image along said first axis.

3. In a machine vision apparatus according to claim 1, the improvement wherein said segment peak finding means includes means for determining said peak value as a function of the score signals generated in connection with application to said match-scoring means of the plurality of pairs of image signals comprising said segment.

4. In a machine vision apparatus according to claim 3, the improvement wherein said segment peak means includes means for determining said peak value by any one of interpolating or extrapolating said score signals.

5. In a machine vision apparatus according to claim 1, the improvement wherein said hill climbing means includes means for invoking said peak finding means to determine segment peaks for successive adjacent segments along a second axis relative to said candidate image, where said second axis is substantially perpendicular to said first axis.

6. In a machine vision apparatus according to claim 5, the improvement wherein said hill climbing means includes means for comparing segment peaks generated by said peak finding means to determine a direction in which those segment peaks increase, and for invoking said peak finding means to determine segment peaks for successive adjacent segments in such direction of increase.

7. In a machine vision apparatus according to claim 1, the improvement further comprising:
   training means for applying to said match-scoring means a plurality of pairs of image signals, said match-scoring means determining for each such pair a value of said selected function, each such pair of image signals comprising a signal representative of said template and a signal representative of a respective successive portion of a model image,
   index means, coupled to said match-scoring means, for indexing the value of said function for each such pair of image signals to provide indexed values, and
   best fit means, coupled to said index means, for identifying a geometric surface of best fit to said indexed values.

8. In a machine vision apparatus according to claim 7, the improvement wherein said training means comprises means for generating said model portion representative signals to represent portions of said model image over a putative search region thereof.

9. In a machine vision apparatus according to claim 7, the improvement wherein said best fit means includes means for identifying an ellipsoid of best fit to said indexed values.

10. In a machine vision apparatus according to claim 9, the improvement wherein said predetermined condition includes both of the following constituent conditions:
    i) an axis of said ellipsoid of best fit must be angularly displaced by no more than about 22.5 degrees with respect to at least one of said first and second axes,
    ii) an elongation ratio of said ellipsoid must be greater than about 2.8.

11. In a machine vision apparatus according to claim 9, the improvement wherein said segment peak finding means includes means for generating said signals representing successive adjacent portion of said candidate image to lie on a first axis defined in accord with an axis of greatest slope of said ellipsoid.

12. In a machine vision apparatus according to claim 1, the improvement wherein said predetermined condition includes at least one of the following constituent conditions:
    i) an axis of said ellipsoid of best fit must be angularly displaced by no more than a pre-selected angle with respect to at least one of said first and second axes, and
    ii) an elongation ratio of said ellipsoid must be greater than a selected value.

13. In a method of operating a machine vision apparatus of the type having
    match-scoring means, responsive to a plurality of pairs of applied image signals, for generating a plurality of score signals as a selected function of said plurality of pairs of applied image signals, an improvement for estimating a location of a template in a candidate image, comprising:

a selectively invocable segment peak finding step for applying to said match-scoring means said plurality of pairs of image signals defining a segment, each such pair including a signal representative of said template and a signal representative of a respective successive portion of said candidate image along a first axis, said segment peak finding step including a step of determining a peak value, and location thereof, of the score signals generated by the match-scoring means in connection with application of the plurality of pairs of image signals comprising said segment, such peak value and location thereof being referred to as a segment peak, storing best-fit geometric surface characteristics, a hill climbing step for invoking said segment peak finding step, only if said best-fit geometric surface characteristics satisfy a predetermined condition, to determine the segment peaks of a plurality of segments, each such segment including image signals from different respective portions of said candidate image along a second axis, said hill climbing step including a step for determining a peak value, and location thereof, of the segment peaks associated with said plurality of segments, such peak value and location thereof being referred to as an image peak, and estimating a location of said template in said candidate image as a function of a location of said image peak.

14. In a method according to claim 13, the improvement wherein said segment peak finding step includes the step of generating, for inclusion in each respective pair of signals along a segment, a signal representing a successive adjacent portion of said candidate image along said first axis.

15. In a method according to claim 13, the improvement wherein said segment peak finding step includes a step of determining said peak value as a function of the score signals generated in connection with application to said match-scoring means of the plurality of pairs of image signals comprising said segment.

16. In a method according to claim 15, the improvement wherein said segment peak finding step includes a step of determining said peak value by any one of interpolating or extrapolating said score signals.

17. In a method according to claim 13, the improvement wherein said hill climbing step includes a step of invoking said peak finding step to determine segment peaks for successive adjacent segments along a second axis relative to said candidate image, where said second axis is substantially perpendicular to said first axis.

18. In a method according to claim 17, the improvement wherein said hill climbing step includes a step of comparing segment peaks generated by said peak finding step to determine a direction in which those segment peaks increase, and for invoking said peak finding step to determine segment peaks for successive adjacent segments in such direction of increase.

19. In a method according to claim 13, the improvement further comprising:

a training step for applying to said match-scoring means a plurality of pairs of image signals, said match-scoring means determining for each such pair a value of said selected function, each such pair of image signals comprising a signal representative of said template and a signal representative of a respective successive portion of a model image, an index step for indexing the value of said function for each such pair of image signals to provide indexed values, and a best fit step, for identifying a geometric surface of best fit to said indexed values.

20. In a method according to claim 19, the improvement wherein said training step comprises a step for generating said model portion representative signals to represent portions of said model image over a putative search region thereof.

21. In a method according to claim 19, the improvement wherein said best fit step includes a step for identifying an ellipsoid of best fit to said indexed values.

22. In a method according to claim 21, the improvement wherein said predetermined condition includes both of the following constituent conditions:

i) an axis of said ellipsoid of best fit must be angularly displaced by no more than about 22.5 degrees with respect to at least one of said first and second axes, ii) an elongation ratio of said ellipsoid must be greater than about 2.8.

23. In a method according to claim 21, the improvement wherein said segment peak finding step includes a step for generating said signals representing successive adjacent portion of said candidate image to lie on a first axis defined in accord with an axis of greatest slope of said ellipsoid.

24. In a method according to claim 13, the improvement wherein said predetermined condition includes at least one of the following constituent conditions:

i) an axis of said ellipsoid of best fit must be angularly displaced by no more than a pre-selected angle with respect to at least one of said first and second axes, and ii) an elongation ratio of said ellipsoid must be greater than a selected value.

* * * * *